United States Patent [19]
Isaka et al.

[11] Patent Number: 5,311,848
[45] Date of Patent: May 17, 1994

[54] INDUCTION SYSTEM FOR ENGINE

[75] Inventors: Yoshiharu Isaka; Masahiro Ito, both of Iwata, Japan

[73] Assignee: Yamaha Hatsudoki Kabushiki Kaisha, Iwata, Japan

[21] Appl. No.: 901,588

[22] Filed: Jun. 19, 1992

[30] Foreign Application Priority Data

Jul. 18, 1991 [JP] Japan ............... 3-203288

[51] Int. Cl.⁵ ............................... F01L 3/20
[52] U.S. Cl. ................ 123/188.14; 123/52 M; 123/308
[58] Field of Search ............ 123/188.14, 302, 308, 123/52 M

[56] References Cited

U.S. PATENT DOCUMENTS

| | | | |
|---|---|---|---|
| 3,422,805 | 1/1969 | Dzianott | 123/188.14 |
| 3,868,940 | 3/1975 | Kirchweger | 123/188.14 |
| 3,884,209 | 5/1975 | List et al. | 123/188.14 |
| 4,105,577 | 5/1979 | Elsbett | 123/188.14 |
| 4,207,854 | 6/1980 | Alford et al. | 123/188.14 |
| 4,256,062 | 3/1981 | Schäfer | 123/188.14 |
| 4,274,368 | 6/1981 | Shaffer | 123/52 M |
| 4,320,725 | 3/1982 | Rychlik | 123/188.14 |
| 4,354,463 | 11/1982 | Otani et al. | 123/308 |
| 4,359,997 | 11/1982 | Lyssy | 123/188.14 |
| 4,398,511 | 8/1983 | Nemazi | 123/188.14 |
| 4,413,598 | 11/1983 | Tsutsumi | 123/306 |
| 4,428,334 | 1/1984 | Klomp | 123/188.14 |
| 4,499,868 | 2/1985 | Kanda et al. | 123/188.14 |
| 4,586,469 | 5/1986 | Okumura et al. | 123/308 |
| 4,699,104 | 10/1987 | Okumura | 123/308 |
| 4,704,996 | 11/1987 | Morikawa | 123/188.14 |
| 4,714,063 | 12/1987 | Oda et al. | 123/308 |
| 4,719,886 | 1/1988 | Kotani et al. | 123/308 |
| 4,774,686 | 11/1989 | Shimizu et al. | 123/188.14 |
| 4,930,468 | 6/1990 | Stockhausen | 123/188.14 |
| 5,146,885 | 9/1992 | Fukuma et al. | 123/308 |

FOREIGN PATENT DOCUMENTS

| | | |
|---|---|---|
| 054964A1 | 6/1982 | European Pat. Off. . |
| 068481A1 | 1/1983 | European Pat. Off. . |
| 0076632 | 4/1983 | European Pat. Off. . |
| 235288A1 | 9/1987 | European Pat. Off. . |
| 0449240 | 10/1991 | European Pat. Off. . |
| 0500123 | 8/1992 | European Pat. Off. . |
| 51-544007 | 12/1976 | Japan . |
| 56-43428 | 4/1981 | Japan . |
| 56-139829 | 10/1981 | Japan . |
| 59-5767 | 2/1984 | Japan . |
| 59-51128 | 3/1984 | Japan .............. 123/308 |
| 60-11206 | 3/1985 | Japan . |
| 61-12940 | 1/1986 | Japan . |
| 63-73532 | 5/1986 | Japan . |
| 61-144223 | 9/1986 | Japan . |
| 63-32122 | 2/1988 | Japan . |
| 63-73534 | 5/1988 | Japan . |
| 2115922 | 9/1990 | Japan . |
| 2230920 | 9/1990 | Japan . |
| 2242226 | 9/1991 | United Kingdom . |

Primary Examiner—Raymond A. Nelli
Assistant Examiner—Erick Solis
Attorney, Agent, or Firm—Knobbe, Martens, Olson & Bear

[57] ABSTRACT

Several embodiments of induction systems for internal combustion engines wherein the effective shape of the intake passage may be changed during engine running conditions to achieve turbulence of the desired type in the combustion chamber and improve volumetric efficiency at low and mid range performance and provide a substantially uninterrupted introduction of charge under high speed running so as to improve the performance throughout the entire engine load and speed ranges. Also, a control valve arrangement is provided in the exhaust system for improving performance under low engine speeds and low engine loads.

55 Claims, 12 Drawing Sheets

INDUCTION SYSTEM FOR ENGINE

BACKGROUND OF THE INVENTION

This invention relates to an induction system for an engine and more particularly to an improved engine induction system that permits the attainment of good performance throughout the entire engine speed and load range.

As is well known, many factors in the design of an internal combustion engine affect their performance. Also, the design of certain factors to achieve optimum performance at one speed and/or load range may deteriorate performance at other speed and load ranges. A typical example of this is the design of the induction system. In order to provide maximum power output, the induction system should provide good charging efficiency which necessitates the absence of turbulence in the intake charge. However, if no turbulence is generated in the induction system and combustion chamber under low speed low load conditions, poor combustion and performance can result. There have, therefore, been proposed systems for cooperation with the induction system to generate turbulence under only certain running conditions. Examples of such induction systems may be found in the copending applications of Yoshiharu Isaka, entitled "Tumble Control Valve for Intake Port," Ser. No. 834,604, filed Feb. 12, 1992 and "Intake Air Control System," Ser. No. 839,111, filed Jun. 3, 1992, which applications are assigned to the assignee hereof.

In the arrangement shown in those patents, there is provided a control valve in the induction passage which is generally positioned at a point adjacent where the induction passage communicates with the valve seat of the cylinder head and at an area where the intake passage has a generally angularly related shape with the control valve positioned at the bight. Although this arrangement is extremely effective in providing the desired degrees and types of turbulence in the combustion chamber under low and mid range performance and no turbulence at high speeds, the flow control pattern which can be accomplished with this type of control valve has some restrictions.

In addition to the question of generating turbulence in the combustion chamber, it is also the practice to tune the length and effective cross-sectional area of the intake passage so as to achieve maximum volumetric efficiency. However, an induction system that is tuned to achieve maximum volumetric efficiency and power at the high speed will be relatively inefficient for charging at low speeds and low load conditions. Although arrangements have been incorporated for changing the tuning of an individual intake passage, this has been done conventionally by changing the effective length of the passage. However, such length changing devices add to the bulk of the induction system with obvious disadvantages.

Specifically, it may be desirable to provide an arrangement wherein the actual shape of the intake passage may be reconfigured so as to change the direction in which the flow passes through the valve seat and also to tune the intake passage for different speed and load conditions.

It is, therefore, a principal object of this invention to provide an improved intake system for an internal combustion engine wherein the actual configuration of the intake passages may be changed during engine running.

It is a further object of this invention to provide an improved induction system for an internal combustion engine wherein the intake port configuration and the flow pattern generated by it can be changed during engine operation.

If it is desired to provide a change in the actual configuration of the induction passage as opposed to providing a flow directing device in the induction passage as in the aforenoted co-pending applications, then this must be done in such a way that facilitates making the change while not unduly complicating the cylinder head.

It is, therefore, a still further principal object of this invention to provide an improved induction system for an internal combustion engine wherein the configuration of the intake passages may be changed during engine operation while maintaining a relatively simple and easily operated structure.

SUMMARY OF THE INVENTION

The features of the invention are adapted to be embodied in an intake arrangement for an internal combustion engine having a combustion chamber and an intake passage having an inlet opening for receiving an intake charge and an outlet opening for delivering the charge. The portion of the intake passage between the inlet opening and the outlet opening define a generally straight section leading to the outlet opening.

In accordance with a first feature of the invention, means are provided for changing the effective angle of the straight section relative to the outlet opening during the running of the engine to redirect the charge flow passing through the outlet opening.

In accordance with another feature of the invention, an element is rotatably supported about an axis that extends generally parallel to the axis of the straight section and which is movable between two positions that provide different flow configurations for the straight section.

DETAILED DESCRIPTION OF THE PREFERRED EMBODIMENTS OF THE DRAWINGS

Figure 1:
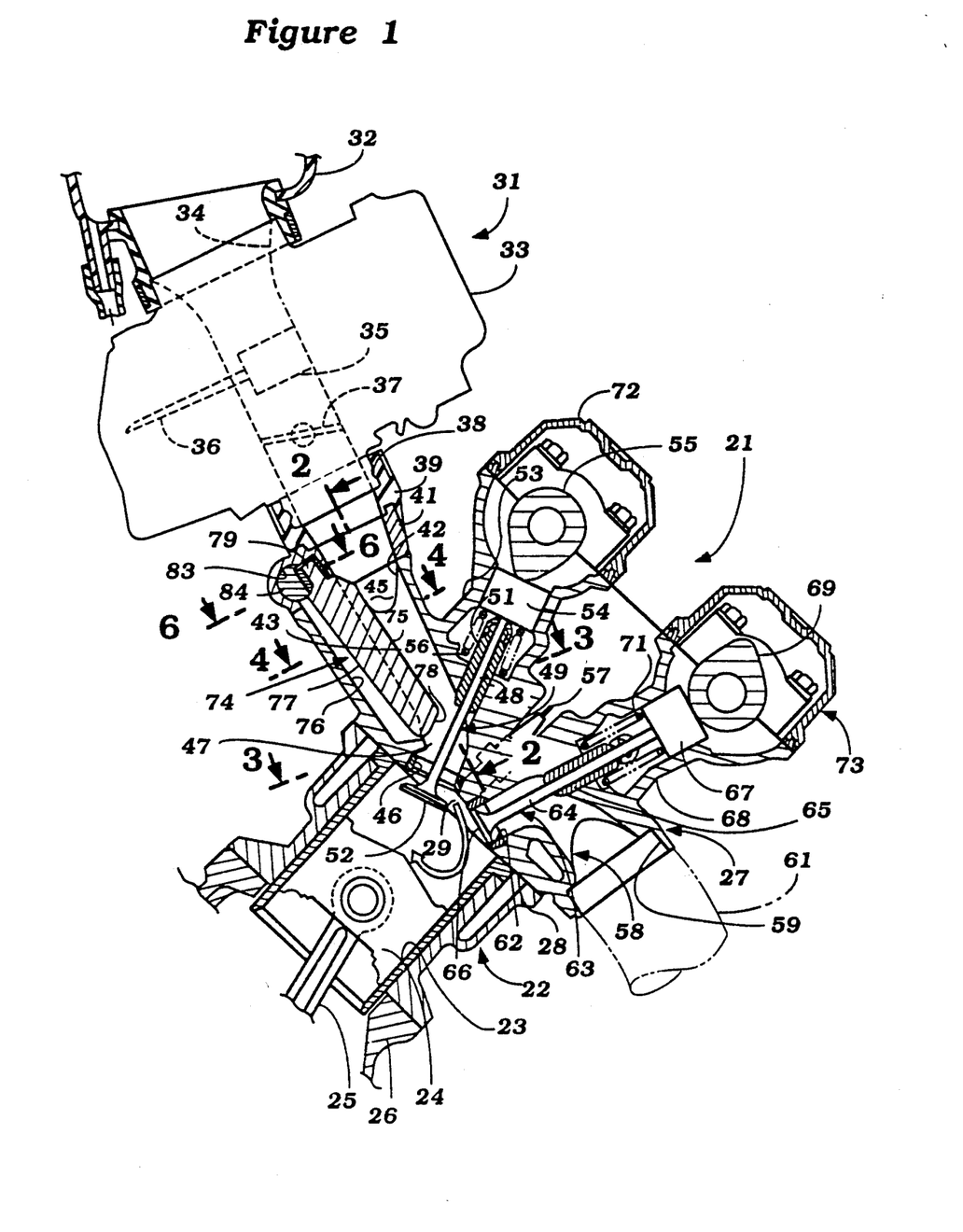
FIG. 1 is a partial cross-sectional view taken through a portion of a cylinder of a multiple cylinder internal combustion engine constructed in accordance with a first embodiment of the invention.

Referring first to the embodiment of FIGS. 1-8 and initially primarily to FIG. 1, a four cylinder in-line reciprocating engine constructed in accordance with this embodiment is shown partially and is identified generally by the reference numeral 21. Since the invention is concerned primarily with the induction system and its interrelationship with the exhaust system, only the upper portion of the engine has been illustrated. Also, the construction has been shown primarily by reference to cross sections taken through a single cylinder or through adjacent cylinders of the engine 21. It is believed that this description will permit those skilled in the art to understand how the invention can be applied to multiple cylinder engines. In fact, the invention may be employed in conjunction with engines having various cylinder numbers and cylinder types as well as four or two cycle engines.

The engine 21 includes a cylinder block 22 having individual aligned cylinder bores 23 in which pistons 24 are supported for reciprocation. The pistons 24 are connected by means of connecting rods 25 to a crankshaft (not shown) that is journaled for rotation within a crankcase chamber formed by a crankcase member 26 that is affixed to the cylinder block 22 in any appropriate manner.

A cylinder head assembly, indicated generally by the reference numeral 27, is affixed in a suitable manner to the cylinder block 22 with a planar lower surface 28 thereof in sealing engagement with the upper portion of the cylinder block 22 around the cylinder bores 23. Individual recesses 29 are formed in the cylinder head lower surface 28 in registry with the cylinder bores 23 to form the combustion chambers thereof along with the pistons 24.

An induction system, indicated generally by the reference numeral 31 and constructed in accordance with an embodiment of the invention is provided for delivering a fuel/air charge to the combustion chambers and specifically the recesses 29. This induction system 31 includes an air inlet device, shown partially and identified by the reference numeral 32, which draws atmospheric air in a well known manner. If desired, the air inlet device 32 may include a silencing system and also an air cleaner and filter system.

A plurality of carburetors 33, one for each of the cylinder bores 23 in the illustrated embodiment, draw air from the air inlet device 32 through their air horns 34. In the illustrated embodiment, the engine 21 is designed for motorcycle application and the carburetors 33 are of the well known sliding piston type, including a sliding piston 35 that controls a metering rod 36 in a well known manner. A manually operated throttle valve 37 of each carburetor 33 is operated from a remote accelerator control, in a well known manner.

Although this embodiment is described in conjunction with a motorcycle type of application, it should be readily apparent to those skilled in the art that the invention may be employed with various other applications for internal combustion engines. The invention, however, has particular utility in use with motor vehicles because of the fact that a motor vehicle operates over widely different speed and load ranges. The induction system of the present invention has particular utility in ensuring good operation over such widely varying running conditions.

Each carburetor 33 has an outlet portion 38 which is telescopically received in an adaptor 39 for connection to the cylinder head 27 in a manner which will be described. The adaptor 39 cooperates with a combined control valve support and control valve actuator arrangement 41 which has an intake passage that is mated with a corresponding inlet opening 42 of the cylinder head 27.

In the illustrated embodiment, the cylinder head 27 is formed with two intake valves per cylinder and to this end the inlet opening 42 serves a pair of parallel intake passages 43 that are formed in side-by-side relationship in the cylinder head 27. The passages 43 are separated from each other by an internal wall 44 that terminates short of the opening 41 so as to form a communicating passageway 45.

Each intake passage 43 has a generally straight section that extends downwardly toward the cylinder head recess 29. Each passage 43 terminates at a valve seat formed by an insert 46. The inserts 46 are formed at an end of a section 47 that joins the straight section 43 at an obtuse angle as clearly seen in FIG. 1.

A pair of poppet type intake valves, indicated generally by the reference numerals 48 have stem portions 49 that are slidably supported within valve guides 51 pressed into the cylinder head 27 for reciprocally supporting the intake valves 48. These valves have head portions 52 that cooperate with the valve seats 46 to open and close the communication of the intake passages 43 with the combustion chamber recesses 29.

The cylinder head 27 has an intake cam tower 53 that has bores which slidably support thimble tappets 54, each associated with a respective one of the intake valves 48. An intake camshaft 55 is rotatably journaled within the cam tower 53 in a suitable manner and has lobes which engage the thimble tappets 54 for opening the intake valves 48. Coil compression springs 56 normally urge the intake valves 48 to their closed position, as is well known in this art.

The fuel/air charge which has been drawn into the combustion chambers through the open intake valves 48 is fired by means of spark plugs 57 mounted in the cylinder head 27 with their gaps extending into the recesses 29. The spark plugs 57 are fired by a suitable ignition system.

Figure 13:
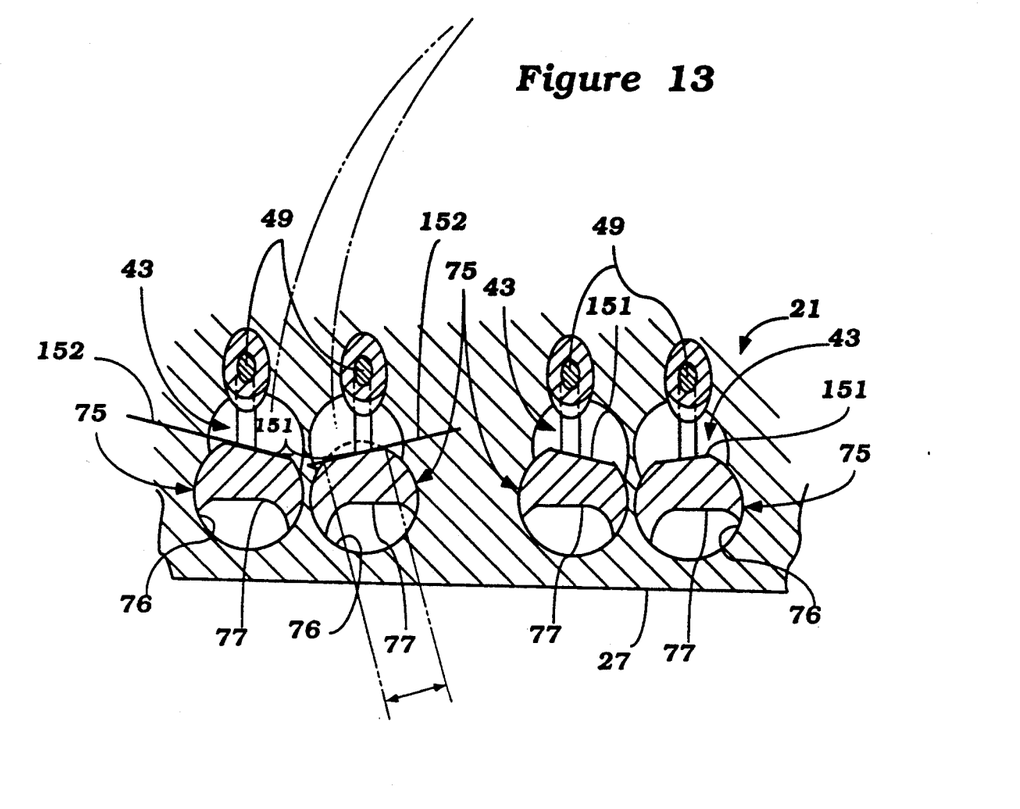
FIGS. 13 and 14 are cross-sectional views corresponding to FIGS. 3 and 4, but for this embodiment.
Figure 14:
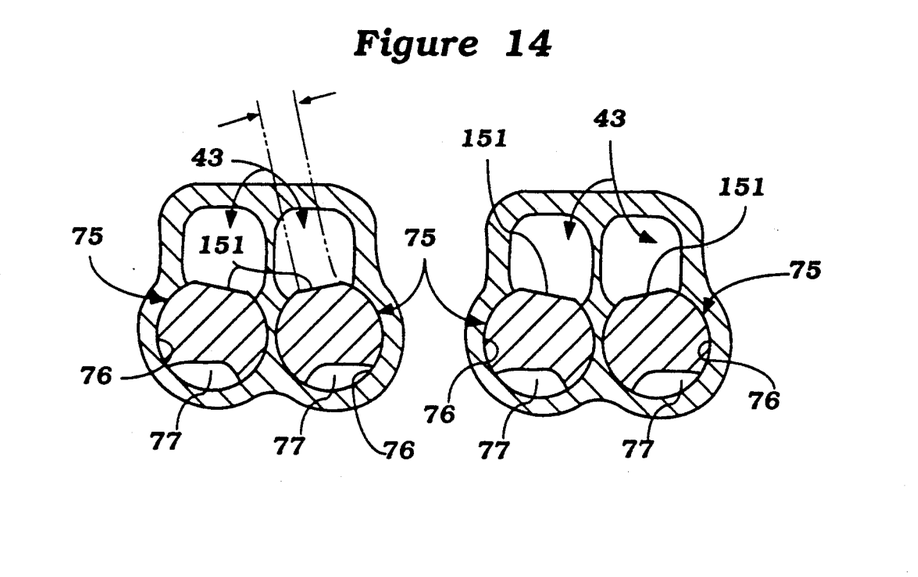

The burnt charge is discharged from the combustion chamber through exhaust passages 58 formed in the side of the cylinder head 27 opposite from the intake passages 43. As with the intake passages 43, there may be provided any number of exhaust passages 58 and the illustrated embodiment shows two per cylinder. These exhaust passages 58 merge into a common exhaust port 59 formed in the exhaust side of the engine to which a manifold 61, which will be described in more detail later by reference to FIGS. 13 and 14, is affixed.

The exhaust passages 58 terminate in exhaust ports formed by exhaust valve seats 62 that are pressed into the cylinder head 27. Exhaust valves 63 have valve stems 64 that are slidably supported in pressed-in guides 65. The exhaust valves 63 have heads 66 that cooperate with the valve seats to open and close the exhaust passages 58.

A plurality of thimble tappets 67 are slidably supported in bores formed in a cam tower 68 on the exhaust side of the engine. The thimble tappets 67 are operated by an exhaust camshaft 69 that is rotatably journaled in the cam tower 68. Coil compression springs 71 normally urge the exhaust valves 63 to their closed positions. The cam towers 53 and 68 are closed by respective cam covers 72 and 73 that are affixed to the cylinder head 27 in an appropriate manner. The camshafts 55 and 56 are driven from the engine crankshaft by any suitable means.

The construction of the engine 21 as thus far described may be considered to be conventional. For this reason, further details of the conventional components of the engine have not been illustrated nor will they be described since they are not necessary to understand the construction and operation of the invention.

With a conventional engine of the type as thus far described, the intake passages 43 are designed so as to be relatively straight, as aforenoted, and provide good charging efficiency for the combustion chamber. This will provide high power outputs to be reached. However, because of the good charging efficiency, when the engine is running at low speeds, there will be no turbulence generated within the combustion chamber. As a result, flame propagation will be quite slow and very poor running will result. In addition, the length and cross-sectional area of the intake passages 43 are tuned to produce maximum charging efficiency at high speeds and high loads. As a result, the charging efficiency at lower speeds and lower loads will not be as effective.

To avoid these problems and produce good performance under all running conditions, the induction system includes a pair of control valve assemblies, each indicated by the reference numeral 74, which are mounted in the intake passages 43 in such a way as to change not only the effective cross-sectional area but also the shape of the passages 43. These control valve assemblies include control valve elements 75 which have a partially cylindrical configuration as best shown in the cross-sectional views of FIGS. 3-6. These valve elements 75 are mounted within bores 76 formed in the cylinder head 27 in a relationship so that they extend substantially parallel to the central axis of the intake passages 43. Thus, the valve elements 75 rotate about axes which are generally parallel to the axes of the intake passages 43. However, the control valves 75 are provided with cut out portions 77 on one side thereof.

When the control valves 75 are positioned as shown in FIGS. 1-4, the cylindrical surfaces of the valves 76 protrude into the intake passages 43 and, in effect, change the configuration and effective cross-sectional are of these intake passages as well as shift their central flow axis toward one side of the valve seats 46. As a result of this, the intake air flow through the passages 43 will be at a higher velocity than when the valves 75 are in their opposite position, to be described, and the flow direction entering the combustion chamber will be as shown by the arrow in FIG. 1. This will generate a tumble action within the combustion chamber that will be maintained and in fact, accelerate as the pistons 24 approach top dead center position. As a result, there will be a high degree of turbulence and the combustion which occurs in the combustion chamber will propagate rapidly so as to ensure complete and good combustion. Also, as will be noted, the charging efficiency of the intake passages 43 will be improved.

It should be noted that the lower ends of the control valves 75 are provided with a rounded area 78 (FIGS. 1 and 2) that causes the transition from the straight portion of the intake passage 43 to that portion 47 merging at the valve seat 46 so as to provide a smooth flow path and not interfere with the turbulence generated.

Figure 3:
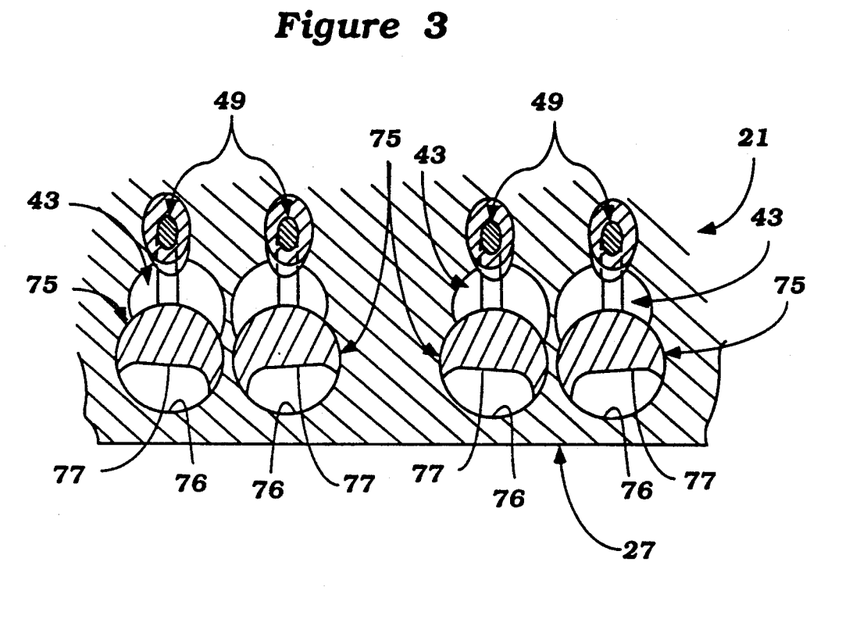
FIG. 3 is an enlarged cross-sectional view taken along the line 3—3 of FIG. 1 showing the control valves in their first positions.
Figure 4:
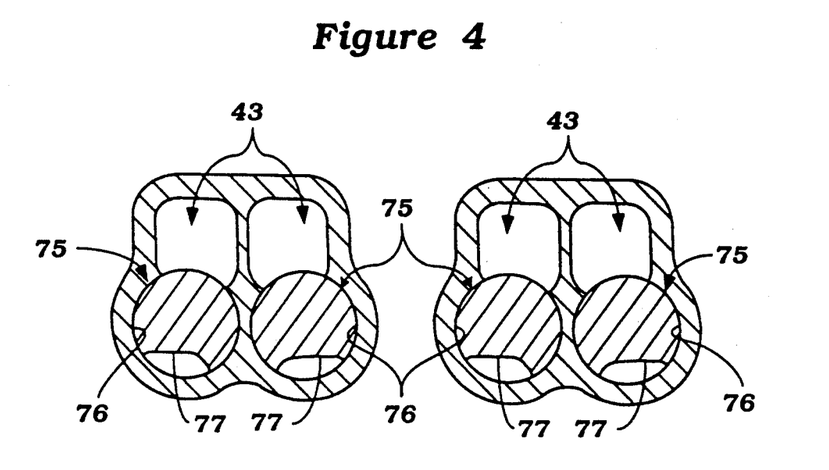
FIG. 4 is an enlarged cross-sectional view taken along the line 4—4 of FIG. 1 showing the control valves in their first positions.
Figure 5:
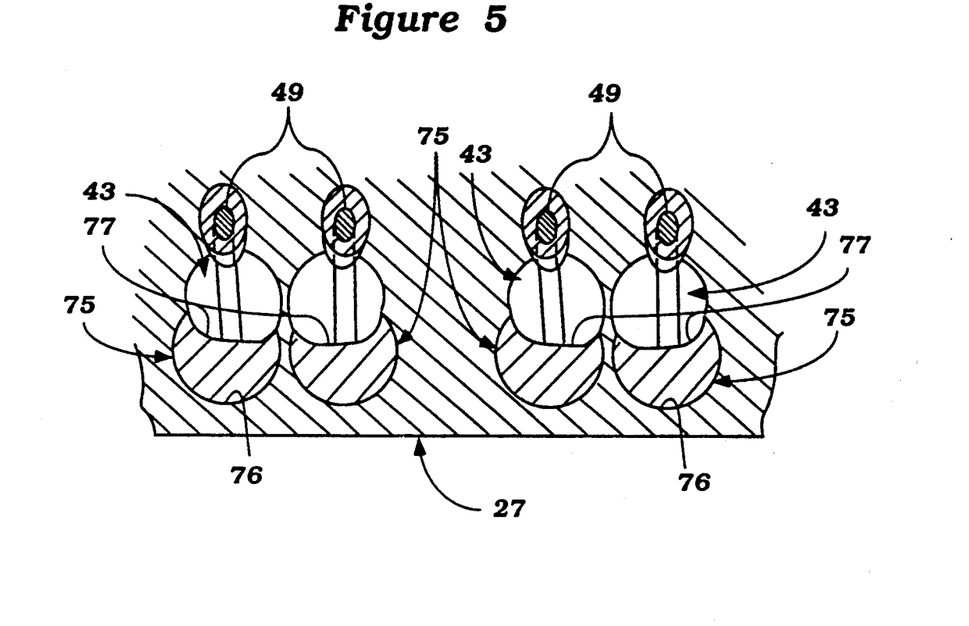
FIG. 5 is a cross-sectional view, in part similar to FIG. 3, showing the control valves in their second positions.
Figure 6:
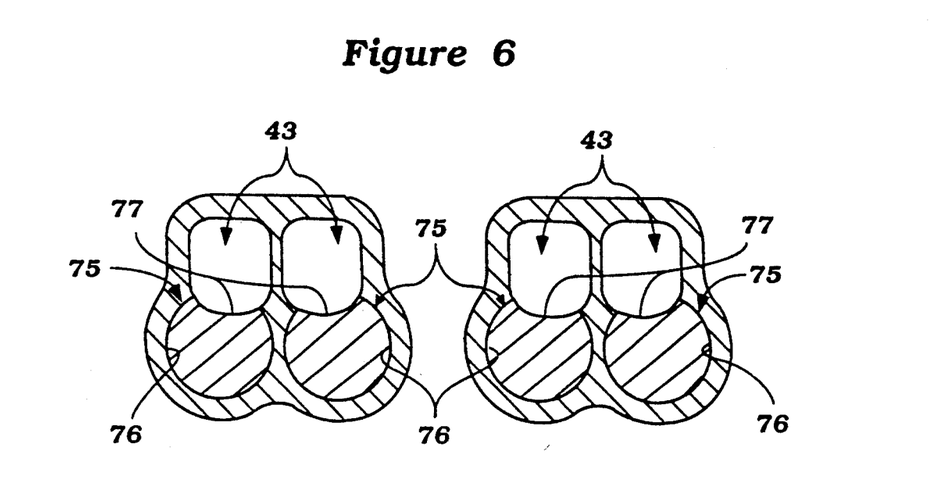
FIG. 6, is a cross-sectional view, in part similar to FIG. 4, showing the control valves in their second positions.

The control valves 75 may be rotated through 180 from the position shown in FIGS. 3 and 4 to the positions shown in FIGS. 5 and 6 by a construction which will be described. When so rotated, the cut out 77 will register with the intake passages 43 and the intake passages 43 will be unobstructed and the flow axes will move more toward the center of the intake valves 57 so as to eliminate the tumble action and provide full and complete charging.

Figure 2:
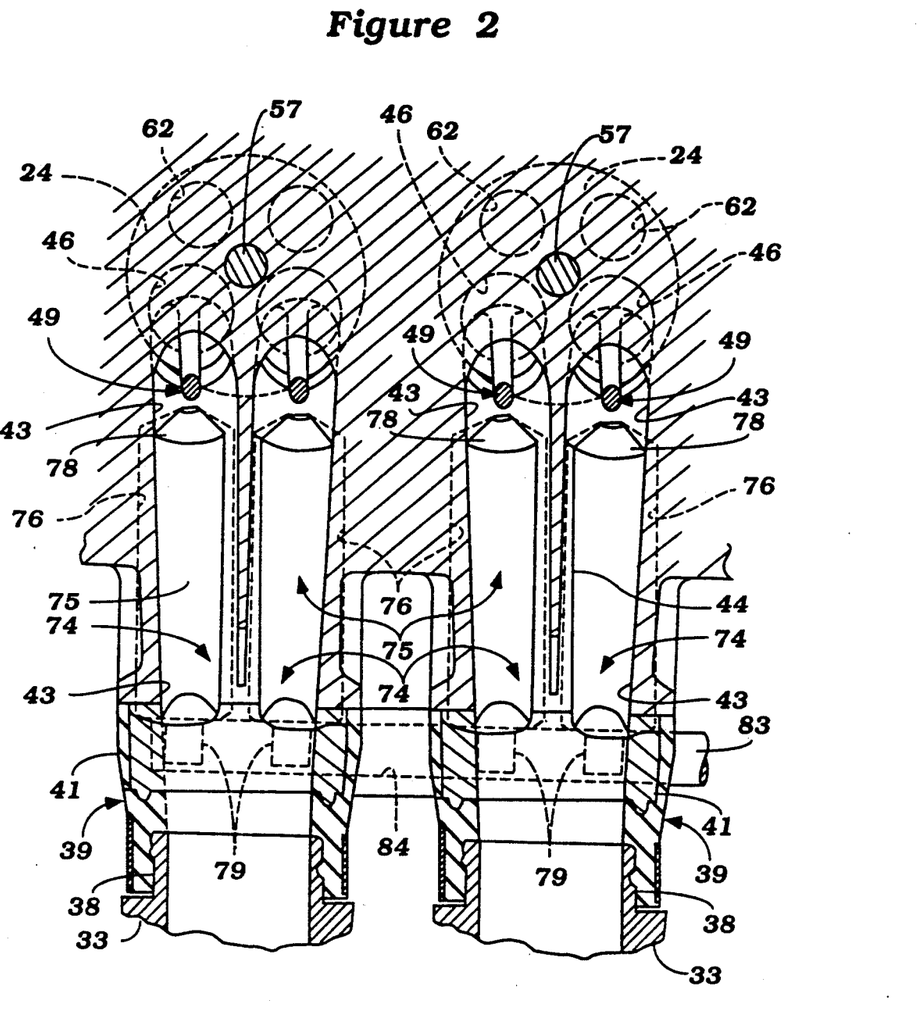
FIG. 2 is an enlarged cross-sectional view taken along the line 2—2 of FIG. 1.
Figure 7:
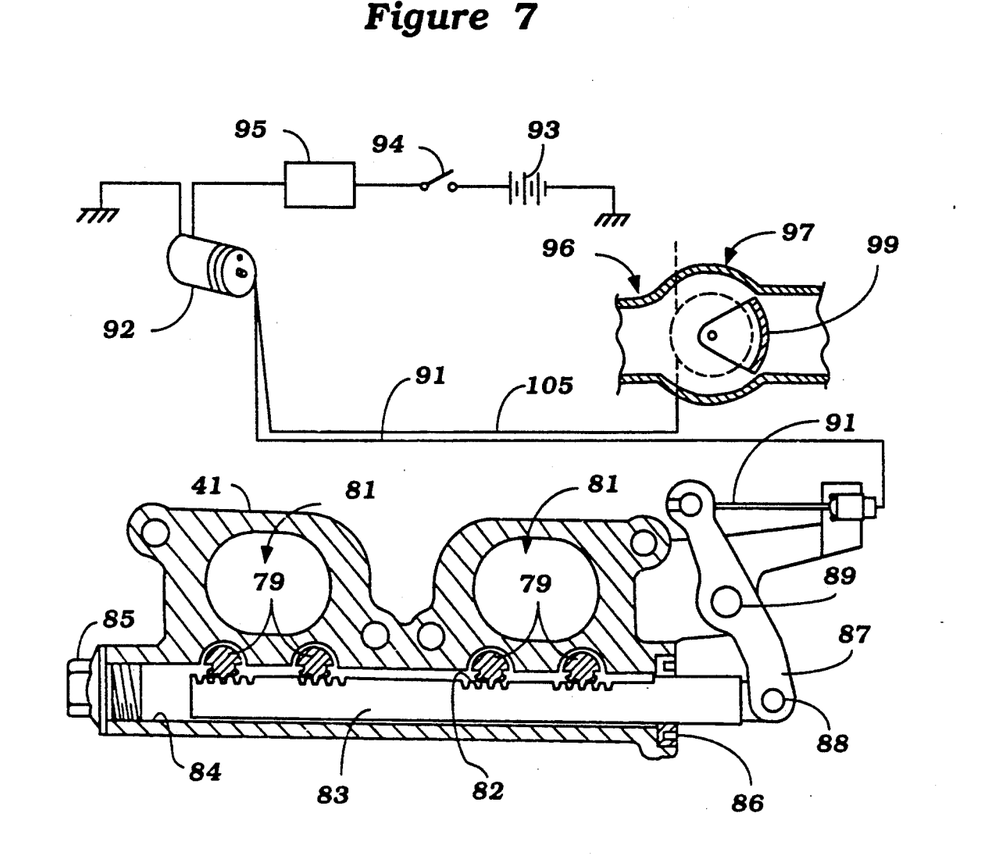
FIG. 7 is a partially schematic view showing the construction for operating the control valves and its interrelationship to the exhaust control valve.

The structure by which the control valves 75 are rotated will now be described by primary reference to FIGS. 1, 2 and 7. The upper ends of the control valves 75 are provided with generally cylindrical portions 79 that are journaled in suitable bores in the member 41. This journaling is accomplished adjacent intake passages 81 formed in the member 41 that meet with the inlet openings 42 of the intake passages 43 in the cylinder head and with the discharge of portion 38 of the carburetors 33 and corresponding openings in the adaptors 39.

These portions 79 are formed with spur gear teeth which are engaged with teeth 82 of a cylindrical rack 83 that is slidably supported in a bore 84 that extends transversely across the member 41. The bore 84 is closed at one end by a closure plug 85 and the rack 83 extends through a seal 86 at the other end of the bore 84. This exposed end of the rack 83 is connected to one end of a bell crank 87 by a pivot pin 88. The bell crank 87 is pivotally supported on the member 41 by means of a pivot pin 89 and its other end is connected to one end of a Bowden wire actuator 91. The opposite end of the Bowden wire actuator is connected to an electric stepping motor 92. The stepping motor 92 is energized by a battery 93 through a main switch 94 and controller 95. The controller 95 operates with a strategy which may be best understood by reference to FIG. 8.

Figure 8:
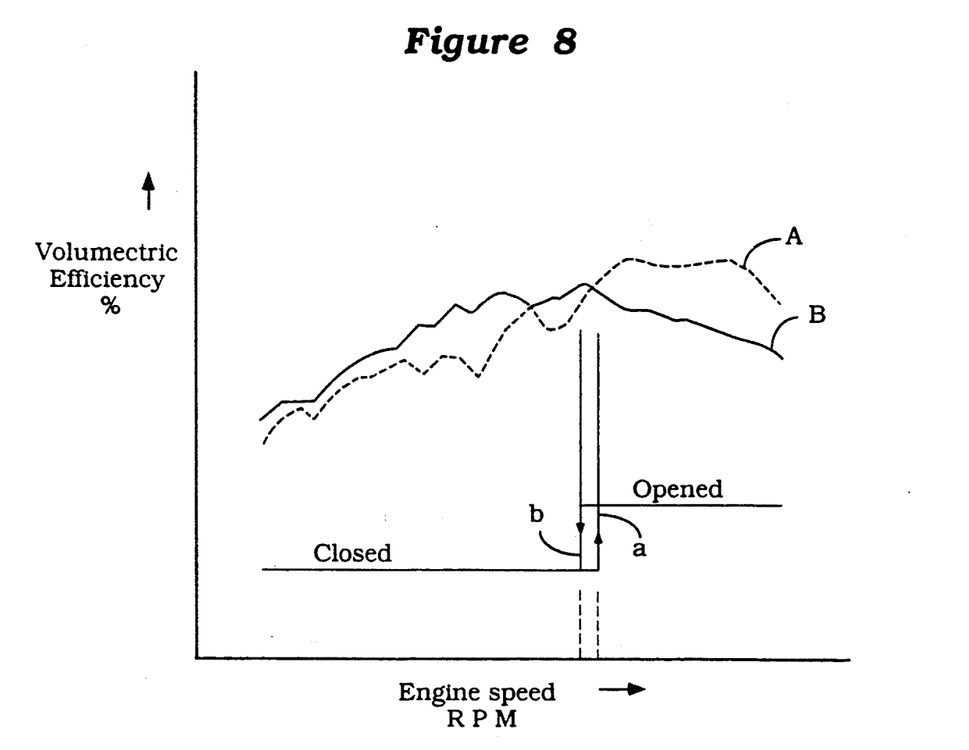
FIG. 8 is a graphical view showing the volumetric efficiency in relation to engine speed and also the positioning of the control valves.

FIG. 8 is a volumetric efficiency curve for the engine 21 operating at wide open throttle. Two curves are shown in FIG. 8, a broken line curve A which is the volumetric efficiency curve generated by the engine when the control valves 75 are in their fully opened positions as shown in FIGS. 5 and 6. The other curve, the solid line curve B, is the volumetric efficiency curve when the control valves 75 are in their closed positions as shown in FIGS. 1-4. It should be readily apparent that when the control valves 75 are in their closed positions, the volumetric efficiency B is better at low engine speeds and loads than if the control valves 75 were in their fully opened positions. In addition to the differences in volumetric efficiency, the configuration of the intake passages 43 when the control valves 75 are in their closed positions will generate more turbulence in the combustion chambers which also improves combustion at low speeds but can reduce intake efficiency at high speeds. It should also be noted that torque curves for the engine when the control valves are in their opened and closed positions would be quite similar to the volumetric efficiency curves.

However, at a certain engine speed the volumetric efficiency of the engine when the control valves 75 are in their closed positions begins to fall off. It is at this point that the control strategy operates to open the valves 75 to their positions of FIGS. 5 and 6. When the engine speed is increasing, the control valves 75 are moved to their opened positions when the engine reaches a speed a which is somewhat higher than the speed b at which the control valves 75 are closed when the engine speed is decreasing. This slight hysteresis in the opening and closing is done so as to improve transition.

The actual speed at which the control valves are opened and/or closed depends not just on speed but also on load. Therefore, the controller 95 is provided with maps indicative of both engine speed and engine load so as to achieve good running under all conditions. Basically, the control valves 75 are closed at low loads in mid range speed conditions and at almost all loads at low speed conditions. Generally, the valve closing occurs at a higher speed as the load decreases, although various control strategies may be employed.

The exhaust system and exhaust control valve employed with this embodiment will now be described by particular reference to FIGS. 9 and 10. The exhaust system is indicated generally by the reference numeral 96 and includes the exhaust manifold's runners 61 previously noted. These runners terminate in a combined expansion chamber catalytic converter assembly, indicated generally by the reference numeral 97. Specifically, the converter assembly 97 includes an outer housing 98 with the manifold runners 61 extending through a front wall thereof so that their outlet openings 99 communicate directly with the interior of the expansion chamber formed by the housing 98.

Figure 9:
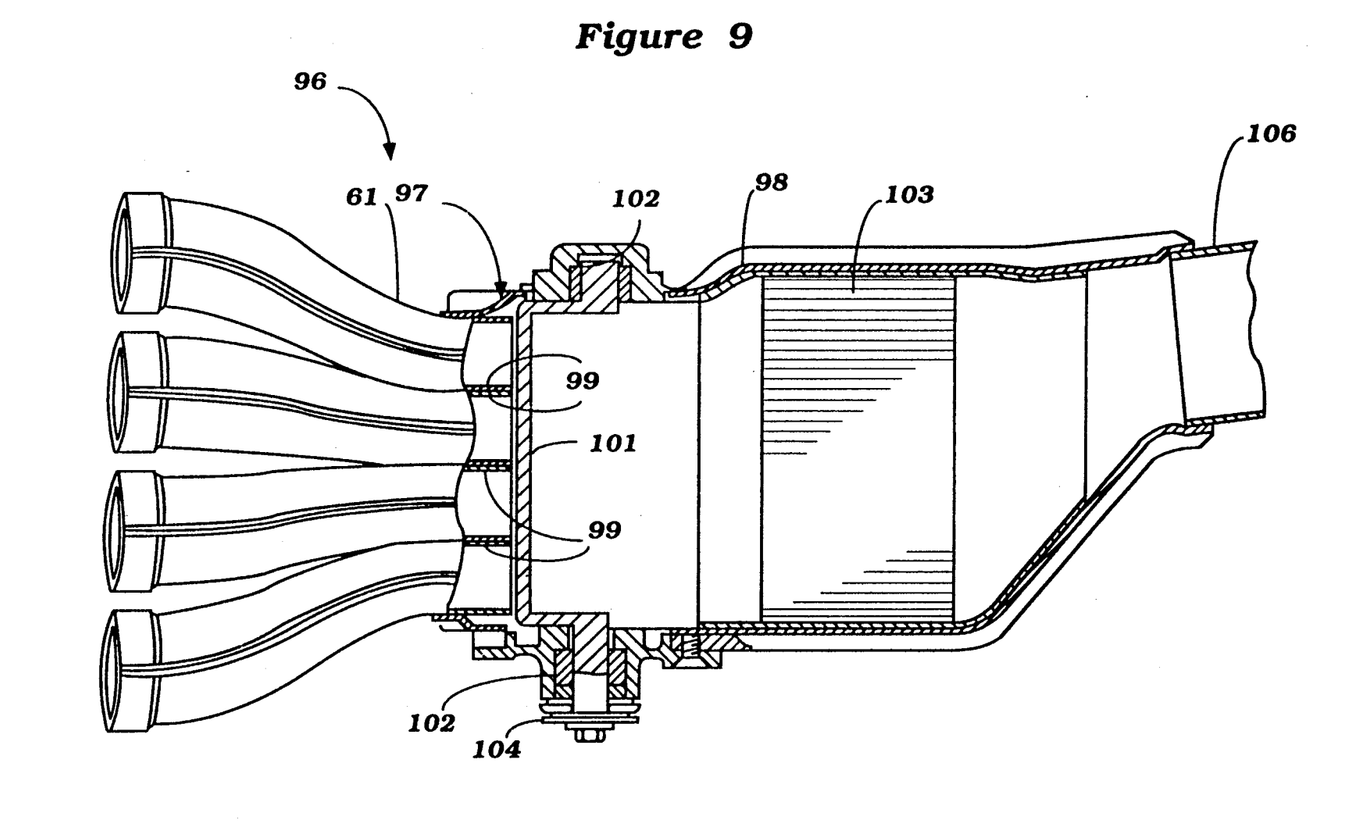
FIG. 9 is a top plan view, with a portion broken away, showing the exhaust system converter and exhaust control valve as may be used with the embodiments of this invention.
Figure 10:
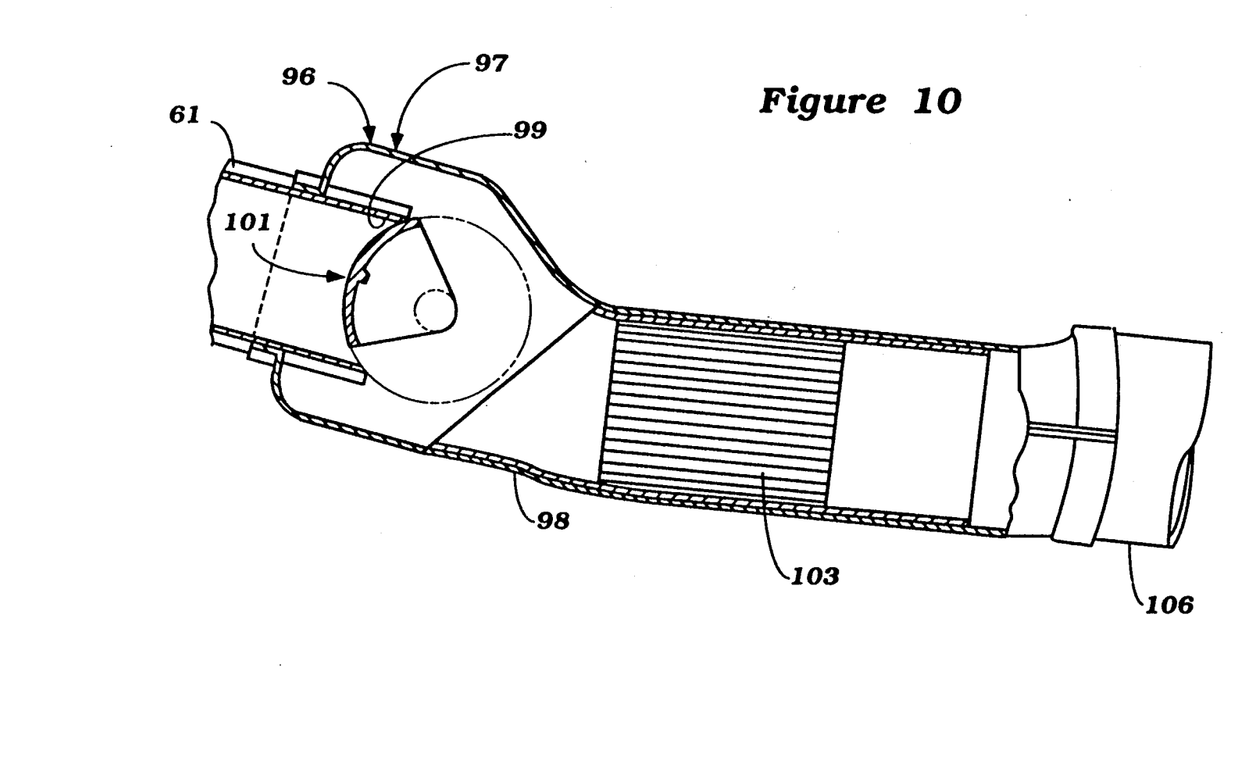
FIG. 10 is a side elevational view of the portion of the exhaust system shown in FIG. 9, with another portion broken away.

An arcuate exhaust control valve element 101 is mounted by means of a pair of spaced apart bearings 102 formed in the housing 98 so that when it is in its reflective position as shown in FIGS. 9 and 10, it will extend across a portion of the openings 99 and cause a reflective sound wave to emanate back to the exhaust ports to improve running under low speed conditions. Because of this improved running generated by the use of the control valve 99 and also the control valves 75 in the intake passages, the engine can run with a lean charge. In order to ensure good operation of a catalytic bed 103 positioned within the housing 98, the manifold sections 61 can be kept quite short and the catalyzer bed 103 can be positioned extremely close to the exhaust passages 58 so as to operate at high efficiency.

A pulley 104 is affixed to one end of the control valve 101 and is operated also by the servo motor 92 through a boden wire cable 105. Although both the exhaust control valve 99 and the intake control valve 75 may be operated by the same servo motor, it is preferred to employ separate servo motors so that different control strategies may be employed for the exhaust control valve 99 than the intake control valves 75.

A tail pipe 106 extends from the control valve and catalyzer assembly 97 and discharges the exhaust gases to the atmosphere. An appropriate muffler (not shown) may be positioned in this exhaust system.

FIGS. 11-14 show another embodiment of the invention which is generally the same as the embodiment of FIGS. 1-10. For that reason, components of this embodiment which are the same as the previous embodiment have been identified by the same reference numerals and will not be described again, except insofar as is necessary to understand the construction and operation of this embodiment.

The first significant difference between this embodiment and that of the previously described embodiment is that the control valves 75 are configured so as to direct the flow of air into the combustion chamber more toward the center of the combustion chamber than the previously described embodiment. To achieve this purpose, the cylindrical portions of the control valves 75 are formed with cut outs or flats 151 which are disposed at an angle to each other as shown by the lines 152 in FIG. 13. This causes the intake air charge to be directed more centrally of the combustion chamber when the control valves 75 are in their closed positions as shown in FIGS. 13 and 14.

Aside from this difference, the construction and operation of the control valves 75 is as previously described and, for that reason, further description of the control valve structure of this embodiment is not believed to be necessary.

Figure 11:
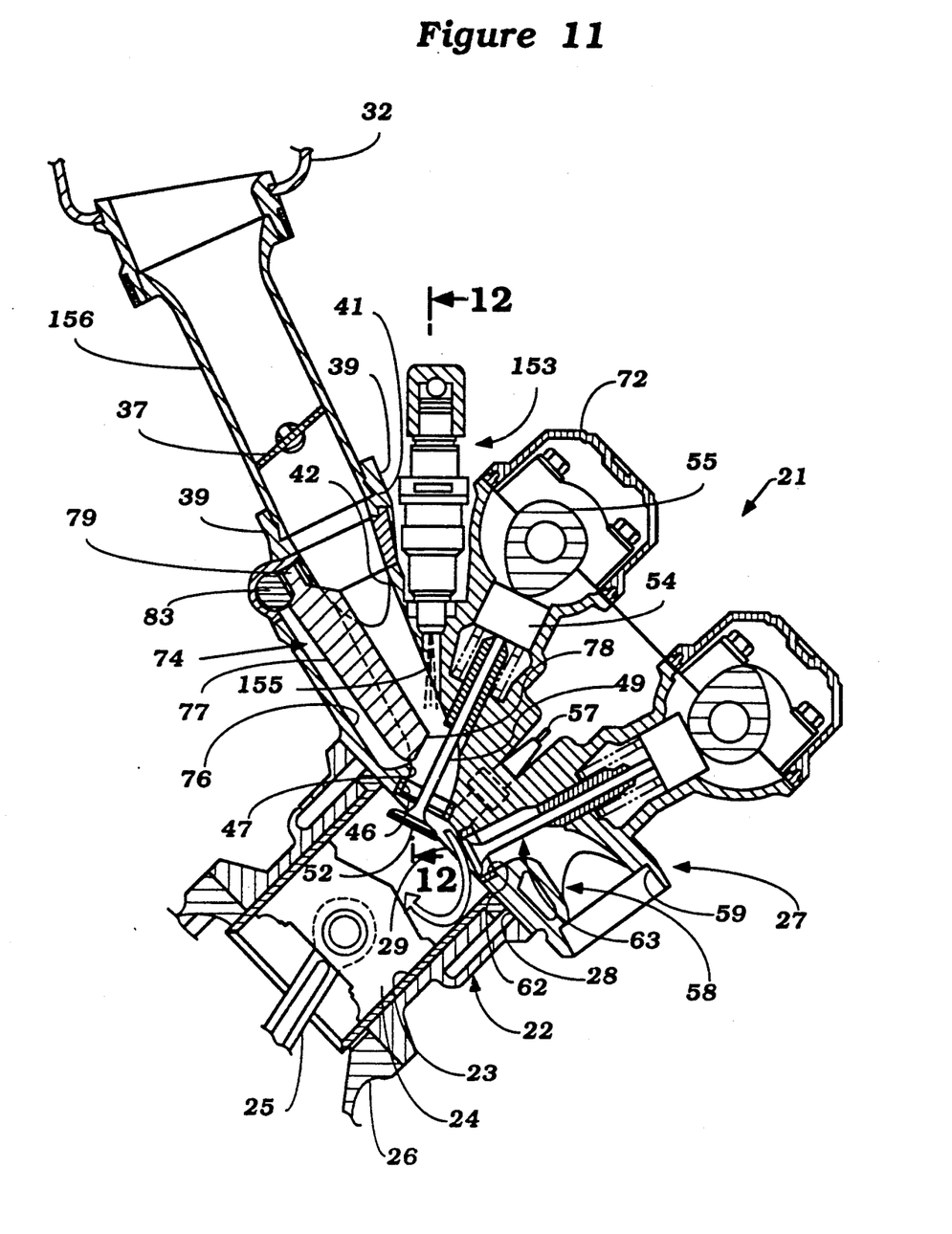
FIG. 11 is a cross-sectional view, in part similar to FIG. 1, and shows another embodiment of the invention.
Figure 12:
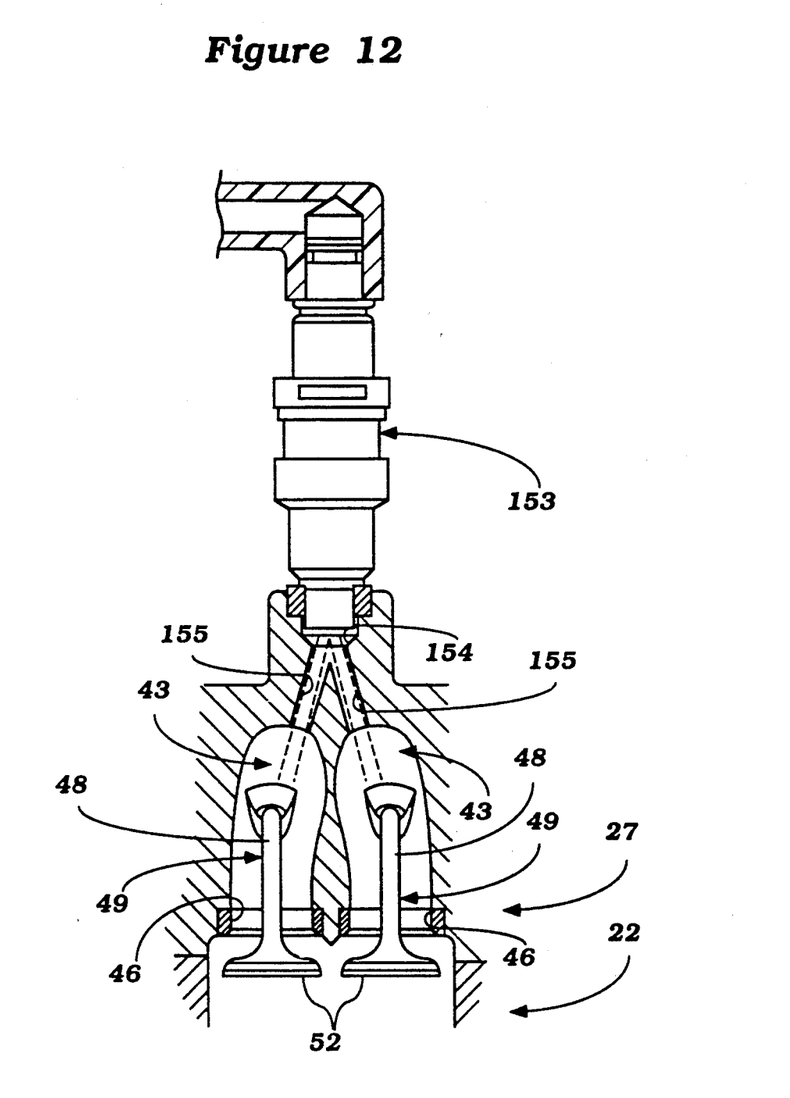
FIG. 12 is a cross-sectional view taken along the line 10—10 of FIG. 11.

This embodiment also differs from the previously described embodiment in that a carburetor is not employed, but rather the charge is supplied by fuel injectors 153 which are mounted in the cylinder head 27 between the intake cam tower 53 and the portion of the cylinder head forming the intake passages 43. A single fuel injector 153 is provided for both intake passages 43 serving the same combustion chamber and as a result, the fuel injector 153 injects into a chamber 154 from which a pair of supply passages 155 radiate, each of which intersects one of the intake passages 43 adjacent the downstream position of the control valve 45. Rather than using a single fuel injector 153 for both intake passages 43, it is to be understood that a separate fuel injector may be provided for each intake passage.

Since no carburetors are employed, the intake air charge is delivered to the induction system from the air inlet device 32 by means of trumpets 156 in which the throttle valves 37 are positioned.

In the embodiments of the invention as thus far described, it should be readily apparent that the control valves 75 are very effective when in their closed positions to direct the flow to one side of the valve seats 46 so as to generate a tumble action in the combustion chamber and to improve volumetric efficiency under low and mid range running. It should be noted, however, that the other side of the valve seat 46 is generally open when the control valves are closed and, therefore, the full benefits of the control valve 75 may not be realized.

Figure 15:
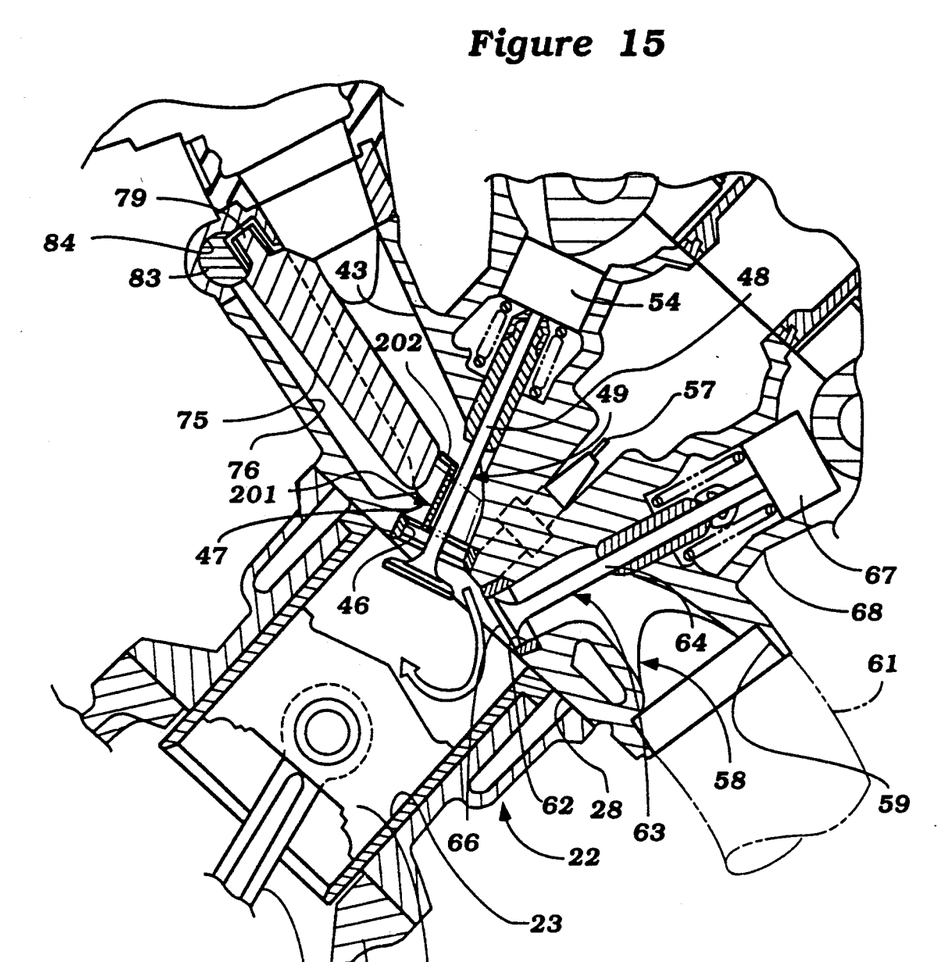
FIG. 15 is an enlarged cross-sectional view, in part similar to FIGS. 1 and 11 and shows another embodiment of the invention.
Figure 16:
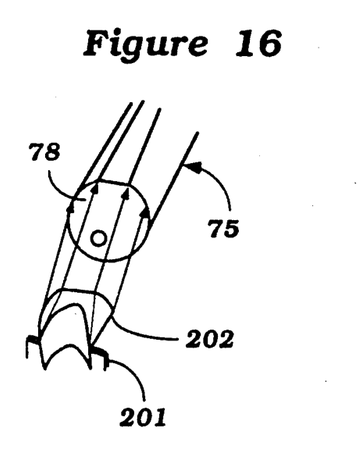
FIG. 16 is an exploded perspective view showing the interrelationship between the rectifier plate and the control valve in this embodiment.

FIGS. 15 and 16 show another embodiment of the invention wherein there is provided a rectifier plate, indicated generally by the reference numeral 201 that is positioned in the bore in which the valve seats 46 are positioned and are retained in place by the valve seats 46. The rectifier plate 201 has a portion 202 that forms an extension of the cylindrical portion of the control valves 75 when the control valves 75 are in their closed positions as shown in FIG. 15 so as to effectively channel all of the air on the back side of the rectifier plate 201 and to further stimulate the tumble action generated in the combustion chamber.

When the control valves 75 are in their open positions, the rectifier plate 201 does not offer any significant air flow resistance to the air flow through the intake passages 43 and, therefore, there is no detrimental effect. In fact, even in this position the rectifier plate 201 may assist in controlling the air flow into the combustion chamber so as to provide good induction and avoid turbulence when it is not desired.

It should be readily apparent from the foregoing description that the described embodiments of the invention are very effective in providing turbulence generated by tumble action in the combustion chamber and improve volumetric efficiency when operating at low speeds and low loads and the attainment of maximum power output without any restriction in the induction passage at high speed and high loads. Of course, the foregoing description has been that of preferred embodiments of the invention and various changes and modifications may be made without departing from the spirit and scope of the invention, as defined by the appended claims.

We claim:

1. An intake arrangement for an internal combustion engine having a combustion chamber, an intake passage having an inlet opening for receiving an intake charge and an outlet opening for delivering a charge, a first portion of said intake passage between said inlet opening toward said outlet opening defining a generally straight section and terminating at a second angularly related portion leading to said outlet opening, and means for changing the effective angle of said straight section to said outlet opening and the shape of the transition between said straight section and said second portions without introducing any void areas during the running of said engine for redirecting the charge flow passing through said outlet opening.

2. An intake arrangement as set forth in claim 1 wherein the means for changing the effective angle of the straight section is operated in response to an engine condition.

3. An intake arrangement as set forth in claim 2 wherein the engine condition is speed.

4. An intake arrangement as set forth in claim 2 wherein the engine condition is load.

5. An intake arrangement as set forth in claim 4 wherein the engine condition also is speed.

6. An intake arrangement as set forth in claim 1 wherein the means for changing the angle of the straight section comprises a movable wall defining the induction passage and having a lower end forming the transition.

7. An intake arrangement as set forth in claim 6 wherein the movable wall is provided by a rotating member.

8. An intake arrangement for an internal combustion engine having a combustion chamber, an intake passage having an inlet opening for receiving an intake charge and an outlet opening for delivering a charge, the portion of said intake passage between said inlet opening and said outlet opening defining a generally straight section leading to said outlet opening, and means for changing the effective angle of said straight section to said outlet opening during the running of said engine for redirecting the charge flow passing through said outlet opening, comprising a rotating member rotatable about an axis substantially parallel to the flow axis of the straight section.

9. An intake arrangement as set forth in claim 1 wherein the outlet opening communicates directly with the combustion chamber.

10. An intake arrangement as set forth in claim 9 wherein the combustion chamber is formed in part by a cylinder head and the intake passage extends through the cylinder head.

11. An intake arrangement for an internal combustion engine having a cylinder head forming in part a combustion chamber, an intake passage in said cylinder head having an inlet opening for receiving an intake charge and an outlet opening for delivering a charge to the combustion chamber, the portion of said intake passage between said inlet opening and said outlet opening defining a generally straight section leading to said outlet opening, a recess in a portion of said cylinder head forming said straight section and means for changing the effective angle of said straight section to said outlet opening during the running of said engine for redirecting the charge flow passing through said outlet opening, said means for changing the angle of said straight section comprises a movable wall contained at least in part in said recess and defining the induction passage in all positions of said movable wall.

12. An intake arrangement as set forth in claim 11 wherein the movable wall is provided by a rotating member.

13. An intake arrangement as set forth in claim 12 wherein the rotating member rotates about an axis substantially parallel to the flow axis of the straight section.

14. An intake arrangement as set forth in claim 12 wherein the means for changing the effective angle of the straight section is operated in response to an engine condition.

15. An intake arrangement as set forth in claim 14 wherein the engine condition is speed.

16. An intake arrangement as set forth in claim 14 wherein the engine condition is load.

17. An intake arrangement as set forth in claim 16 wherein the engine condition also is speed.

18. An intake arrangement as set forth in claim 10 wherein there are two intake passages each serving the same combustion chamber and each having means for changing the effective angle of the respective intake passage.

19. An intake arrangement for an internal combustion engine having a cylinder head defining in part a combustion chamber, a pair of intake passages each having an inlet opening for receiving an intake charge and an outlet opening for delivering a charge to the combustion chamber formed in said cylinder head, the portion of said intake passages between said inlet openings and said outlet openings defining generally straight sections leading to said outlet openings, and means for changing the effective angle of said straight sections to said outlet openings during the running of said engine for redirecting the charge flow passing through said outlet openings and to direct the flow toward the center of said combustion chamber.

20. An intake arrangement as set forth in claim 19 wherein the rotating member rotates about an axis substantially parallel to the flow axis of the straight section.

21. An intake arrangement as set forth in claim 20 further including a common actuator for operating the rotating members.

22. An intake arrangement as set forth in claim 21 wherein the rotating members are supported within bores formed in the cylinder head.

23. An intake arrangement for an internal combustion engine having a combustion chamber, an intake passage having an inlet opening for receiving an intake charge and an outlet opening for deliverying a charge, the portion of said intake passage between said inlet opening and said outlet opening defining a generally straight section leading to said outlet opening, means for changing the effective angle of said straight section to said outlet opening during the running of said engine for redirecting the charge flow passing through said outlet opening, and a rectifier plate affixed adjacent said outlet opening and dividing said flow passage into first and second portions, said means for changing the effective angle of said straight section being effective to cooperate with said rectifier plate so as to direct flow only through one of said portions when the means for changing the angle is in one position.

24. An intake arrangement as set forth in claim 23 wherein the rectifier plate and the means for changing the effective angle defines the complete flow passage when the means is in its one position.

25. An intake arrangement as set forth in claim 24 wherein the means for changing the angle of the straight section comprises a movable wall defining the induction passage.

26. An intake arrangement as set forth in claim 25 wherein the movable wall is provided by a rotating member.

27. An intake arrangement as set forth in claim 26 wherein the rotating member rotates about an axis substantially parallel to the flow axis of the straight section.

28. An intake arrangement as set forth in claim 27 wherein the outlet opening communicates directly with the combustion chamber.

29. An intake arrangement as set forth in claim 28 wherein the combustion chamber is formed in part by a cylinder head and the intake passage extends through the cylinder head.

30. An intake arrangement for an internal combustion engine having a combustion chamber, an intake passage having an inlet opening for receiving an intake charge and an outlet opening for deliverying the charge, wall means defining the portion of the intake passage between said inlet opening and said outlet opening for directing the flow from said inlet opening to said outlet opening, and means for changing the effective shape of said wall means while maintaining continuity of said wall means between said inlet opening and said outlet opening for redirecting the charge flow passing through said outlet opening.

31. An intake arrangement as set forth in claim 30 wherein the means for changing the effective shape is operated in response to an engine condition.

32. An intake arrangement as set forth in claim 31 wherein the engine condition is speed.

33. An intake arrangement as set forth in claim 31 wherein the engine condition is load.

34. An intake arrangement as set forth in claim 33 wherein the engine condition also is speed.

35. An intake arrangement as set forth in claim 30 wherein the movable wall is provided by a rotating member.

36. An intake arrangement as set forth in claim 35 wherein the rotating member rotates about an axis substantially parallel to the flow axis of the intake passage.

37. An intake arrangement as set forth in claim 30 wherein the outlet opening communicates directly with the combustion chamber.

38. An intake arrangement as set forth in claim 30 wherein the combustion chamber is formed in part by a cylinder head and the intake passage extends through the cylinder head.

39. An intake arrangement as set forth in claim 38 wherein the movable wall is provided by a rotating member.

40. An intake arrangement as set forth in claim 30 wherein the rotating member rotates about an axis substantially parallel to the flow axis of the intake passage.

41. An intake arrangement as set forth in claim 40 wherein the rotating member is operated in response to an engine condition.

42. An intake arrangement as set forth in claim 41 wherein the engine condition is speed.

43. An intake arrangement as set forth in claim 41 wherein the engine condition is load.

44. An intake arrangement as set forth in claim 43 wherein the engine condition also is speed.

45. An intake arrangement as set forth in claim 38 wherein there are two intake passages each serving the same combustion chamber and each having means for changing the effective shape of the respective intake passage.

46. An intake arrangement as set forth in claim 45 wherein the means for changing the effective shape of the respective passages also is effective to direct the flow toward the center of the associated combustion chamber.

47. An intake arrangement as set forth in claim 46 wherein the means for changing the effective shape comprises a rotating member rotatable about an axis substantially parallel to the flow axis of the intake passage.

48. An intake arrangement as set forth in claim 47 further including a common actuator for operating the rotating members.

49. An intake arrangement as set forth in claim 48 wherein the rotating members are supported within bores formed in the cylinder head.

50. An intake arrangement as set forth in claim 30 further including a rectifier plate affixed adjacent the outlet opening and defining the flow passage into first and second portions, the means for changing the effective shape being effective to cooperate with the rectifier plate so as to direct flow only through one of the portions when the means for changing the angle is in one position.

51. An intake arrangement as set forth in claim 50 wherein the rectifier plate and the means for changing the effective shape defines the complete flow passage when the means is in its one position.

52. An intake arrangement as set forth in claim 51 wherein the movable wall is provided by a rotating member.

53. An intake arrangement as set forth in claim 52 wherein the rotating member rotates about an axis substantially parallel to the flow axis of the intake passage.

54. An intake arrangement as set forth in claim 53 wherein the outlet opening communicates directly with the combustion chamber.

55. An intake arrangement as set forth in claim 54 wherein the combustion chamber is formed in part by a cylinder head and the intake passage extends through the cylinder head.

* * * * *